United States Patent [19]

Hamatani

[11] Patent Number: 4,894,899

[45] Date of Patent: Jan. 23, 1990

[54] CAMSHAFT BUSHING POSITIONER

[76] Inventor: George Hamatani, Rte. 1, Box 400, Clarksburg, Calif. 95612

[21] Appl. No.: 188,348

[22] Filed: May 4, 1988

[51] Int. Cl.⁴ .............................................. B23P 19/04
[52] U.S. Cl. ........................................ 29/252; 29/278
[58] Field of Search ............. 123/90.1; 29/252, 213, 29/263, 275, 271, 278, 724

[56]          References Cited
           U.S. PATENT DOCUMENTS

| | | | |
|---|---|---|---|
| 1,863,956 | 6/1932 | Wilson | 29/275 |
| 3,174,218 | 3/1965 | McConaha | 29/263 |
| 3,209,445 | 10/1965 | Moskovitz | 29/275 |
| 3,268,995 | 8/1966 | Pullin | 29/275 |
| 3,654,685 | 4/1972 | Shiflet | 29/252 |
| 4,509,241 | 4/1985 | Freeland et al. | 29/263 |
| 4,586,229 | 5/1986 | Pendola | 29/252 |
| 4,619,027 | 10/1986 | Ohannesian | 29/275 |
| 4,624,041 | 11/1986 | Gathright et al. | 29/263 |

Primary Examiner—Willis R. Wolfe
Assistant Examiner—M. Macy
Attorney, Agent, or Firm—Lothrop & West

[57]          ABSTRACT

A positioner for use in removing from or installing camshaft bushings in a camshaft alley of an engine employing a camshaft extending along an axis and having a front planar face normal to the axis includes a yoke removably secured to the engine front face. A bar is supported by the yoke in place of the removed engine camshaft. A motor interconnects the yoke and the bar for relative axial motion. Bushing-engaging sleeves removably lock axially around and onto the bar at locations axially spaced to abut the ends of the bushings at the various locations of the engine camshaft bushings.

8 Claims, 5 Drawing Sheets

CAMSHAFT BUSHING POSITIONER

BACKGROUND OF THE INVENTION

1. Field Of The Invention

The invention relates to tools for servicing internal combustion engines.

2. Description Of The Related Art

No preliminary examination of the art has been made, and the applicant has no knowledge of any related art.

SUMMARY OF THE INVENTION

A positioner for engine camshaft bushings includes a jack, preferably hydraulic, engageable with an engine crankcase adjacent the camshaft alley housing to exert on one or more camshaft bushings a force sufficient to move the bushings into and out of working position. The jack also is engageable with a yoke temporarily fastened to the camshaft alley housing. A bar removably extending through the hollow piston rod of the jack and through the camshaft bushings carries removable, hinged sleeves adapted to abut the jack piston and transfer the force from the jack to the bar. The bar also carries removable fittings which abut the front faces or, alternatively, the rear faces of the bushings. When in place, the sleeves are axially immovable on the bar and, preferably, are also rotarily immovable on the bar.

Most modern, internal combustion, reciprocating engines employ poppet valves arranged in a sequence to be actuated by a camshaft extending along an axis within the engine crankcase or in the engine head and disposed in a direction parallel to the crankshaft axis. The cams are usually spaced apart along the camshaft with substantial intervals between cams. The cam lobes extend radially from the camshaft a distance slightly less than the diameter of the camshaft bearings disposed in several spaced bearing webs extending across the crankcase or camshaft alley. The camshaft bearings run in several bushings removably seated in the crankcase webs or, with an overhead camshaft, seated in the engine head. Lubrication arrangements vary, but usually there is a pressure lubrication system supplying oil through passages in the webs and through radial holes in the bushings often with oil escape through notches in the ends of the bushings.

While in many such engines designed for light duty the camshaft bushings have a life equivalent to that of the rest of the engine, there are some heavy duty engines, such as tractor engines or heavy equipment engines, in which the camshaft bushings are subject to substantial wear and so require changing after a number of hours of operation. With the customary mechanic's or shop tools, a camshaft bushing replacement may be a difficult and extended task and is not always done satisfactorily, not only with getting the new bushings in the right axial locations, but especially with getting the bushing oil holes to register with the oil passages in the engine crankcase or camshaft alley webs. A misregistered oil hole can result in prompt failure of a newly installed bushing.

It is therefore an object of the invention to provide special tooling and a special manner of procedure so that the removal of worn bushings from the camshaft alley of an engine, whether in the head or in the crankcase, is a simple, straightforward and efficient operation.

It is a further object of the invention to provide appropriate special tooling for installing new or replacement camshaft bushings in an engine block or head and to arrange the special tooling so that the bushings are accurately and properly positioned both axially and polarly.

It is a further object of the invention to provide such tooling that can be readily understood and used by any good mechanic and that is easy for him to operate.

Another object of the invention is in general to provide an improved camshaft bushing positioner especially for use on an engine having camshaft bushings arranged in line along a camshaft axis.

Other objects, together with the foregoing, are attained in the embodiment of the invention described in the accompanying description and illustrated in the accompanying drawings.

DESCRIPTION OF THE PREFERRED EMBODIMENT

A typical or representative engine with which the camshaft bushing positioner of the invention can be utilized has a crankcase 6 inclusive of a camshaft alley 7 extending along a common axis 8 and suitable for the number of cylinders provided. The crankcase 6 and the camshaft alley 7 have a planar, transverse forward face 9 to which a camshaft timing gear cover is normally secured by bolts entering into appropriate threaded holes (not shown). In this case, as appears in the drawing, the usual bolts have been removed and the cover has been removed to expose the face 9. The timing gear (of the camshaft) and the camshaft itself have been removed.

Pursuant to the invention, there is introduced axially into the partially stripped camshaft alley 7 a special bar 12 having an axis that becomes coincident with the axis 8 as the bar enters with ample clearance into and through the several bushings 13 (see FIG. 9) seated in their respective bushing carriers 14 of the crankcase. The bushing carriers are part of several cross webs 16 of the crankcase and vary in axial length (short and long) with their individual bushings. Usually, the center and end bushings are long, while the remaining, intermediate bushings are short.

Often each bushing is fabricated by forming the opposite ends of a flat strip with complementary notches and lugs and then rolling the strip into a circular-cylindrical form with the lugs and notches interlocked. Each carrier supports a bushing, and each bushing has a radial oil hole 17 (see FIGS. 6 and 7) adapted to register with an oil passage 18 in the related web 16, and being part of the pressure lubricating system of the engine.

Oil escaping from the ends of the bushing and from a notch 19 (FIG. 6) in the end of the bushing falls into the camshaft alley or into the crankcase and is recirculated by the customary lubrication pressure pump (not shown).

The bar 12, along its length, is particularly provided with circumferential grooves 21 intersected by short axial grooves 22. Each groove 22 comprises a long leg 22A and a short leg 22B on opposite sides of the groove 21 (see FIG. 8) for a purpose to be described subsequently in more detail.

The grooves 21 are axially spaced apart to correspond to, although not necessarily register with, the bearing webs 16. The bar 12 is largely symmetrical and can for most purposes be turned end for end—one way for pushing and the other way for pulling. The bar is long enough to extend forwardly out of the camshaft alley, and either bar end can be inserted from the front of the engine.

A special U-shaped yoke 23 used to insert bushings, although not limited to this function, is removably fastened to the face 9 of the crankcase by bolts 24 that engage the threaded holes available after the timing gear cover is removed. The U-shaped yoke 23 has open sides for ready accessibility and visibility and has a central hub 26. One of the yoke arms 25 has a guide bore 27 extending in an axial direction and at a convenient circular location to receive an axially extending rod 28 slidable in the yoke and secured in adjusted position by a set screw 29. A groove 31 in the rod forms a good seat for the set screw 29.

The forward end of the bar 12 is engaged to be axially movable by a jack 35, or motor (pneumatic or hydraulic), having a piston tube 32 (FIGS. 9 and 12) joined to a piston 33 reciprocable in a cylinder 34 having ports 36 and 37 available to be connected, if pneumatically actuated, to air under pressure or to the atmosphere.

Figures 12, 13, 14, 15:
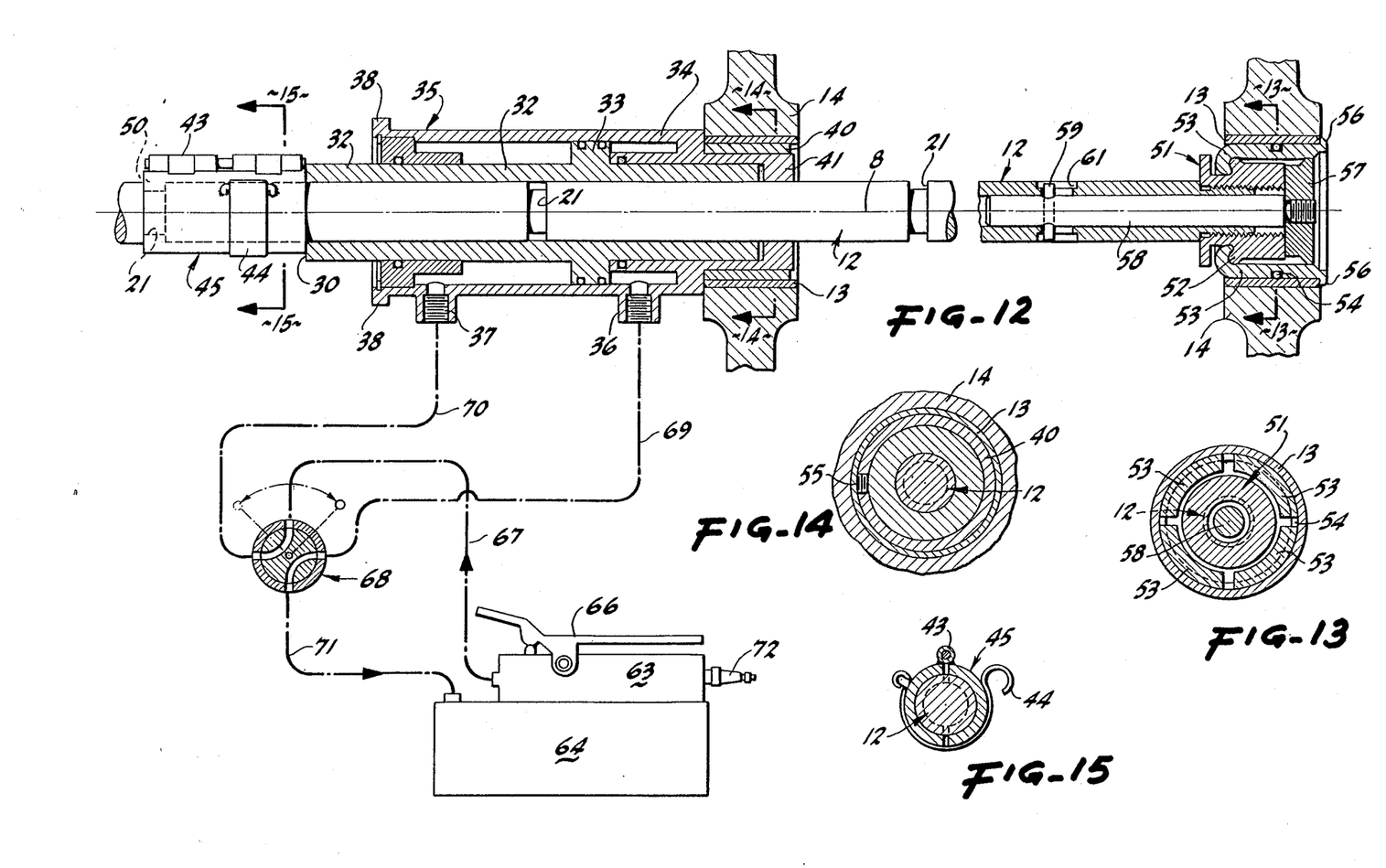
FIG. 12 is a view similar to FIG. 9 and showing the jack actuating circuit.
FIG. 13 is a cross-section on the line 13—13 of FIG. 12.
FIG. 14 is a cross-section on the line 14—14 of FIG. 12.
FIG. 15 is a cross-section on the line 15—15 of FIG. 12.

If hydraulic actuation is desired, the ports 36 and 37 can be connected by known means to a hydraulic pressure fluid system under operator control (see FIG. 12).

In order to anchor the jack, one end of the cylinder 34 has a bayonet connector 38 (FIGS. 1 and 4) detachably engageable with a bayonet socket 39 in the yoke hub 26. The other end 41 of the cylinder is specially reduced in size. When the cylinder is turned end for end, the yoke 23 is omitted and the reduced end portion 41 seats directly in the engine front bushing 13 (FIG. 9) or in a special adapter 40 held on the reduced end portion 41 by a set screw 55 (FIG. 14) and so sized as to rest in the engine front bushing 13 for a particular mode of use.

The jack 35 in its simplest embodiment; i.e. as a single-acting pressure unit, differs from the customary double-ended, double-acting pressure unit illustrated in FIG. 12, although it is similar in appearance. A principal distinction is that as a single-acting unit, the port 36 is from time to time connected briefly or momentarily to an air hose nozzle for pneumatic actuation, or momentarily to a source of hydraulic pressure for hydraulic actuation. The other port 37 is normally open to the atmosphere, although if hydraulic pressure is used, the port 37 may be connected to a sump or drain substantially at atmospheric pressure. The chamber at the end of the cylinder closest to the cylinder end 41 is the only chamber that is ever pressurized and so gives force in only one direction. When force in the other direction is needed, the cylinder or jack is demounted, turned end for end, and then is supported or mounted by its other end. This change in jack or cylinder position reverses the direction of action of the force available. Note the difference in jack mountings in FIGS. 1 and 9.

The construction and operation of the double-acting pressure unit shown in FIG. 12 will subsequently be described in detail.

Figure 16:
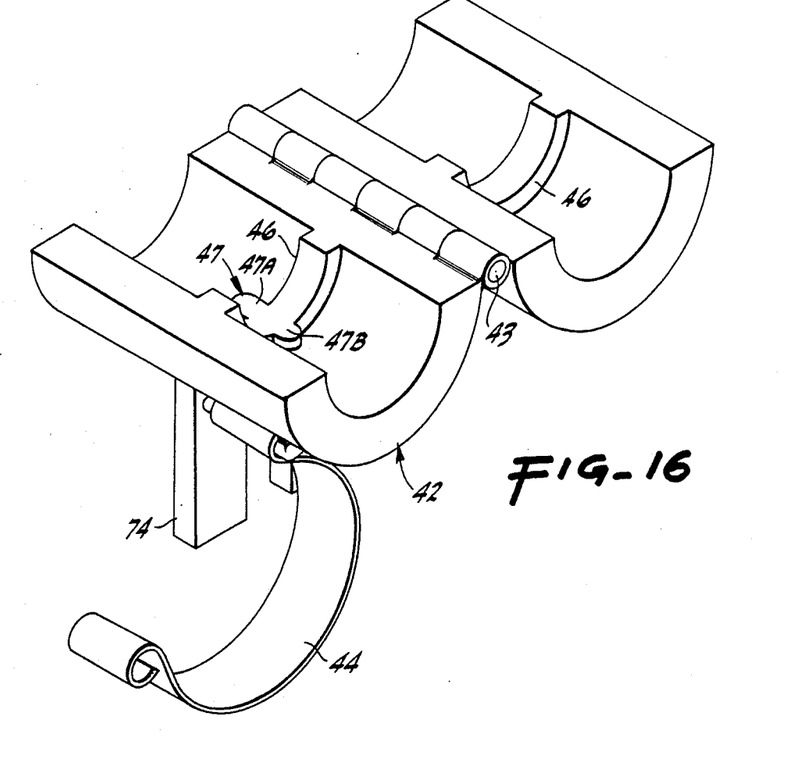
FIG. 16 is an isometric view of a bushing installing positioner.
Figure 17:
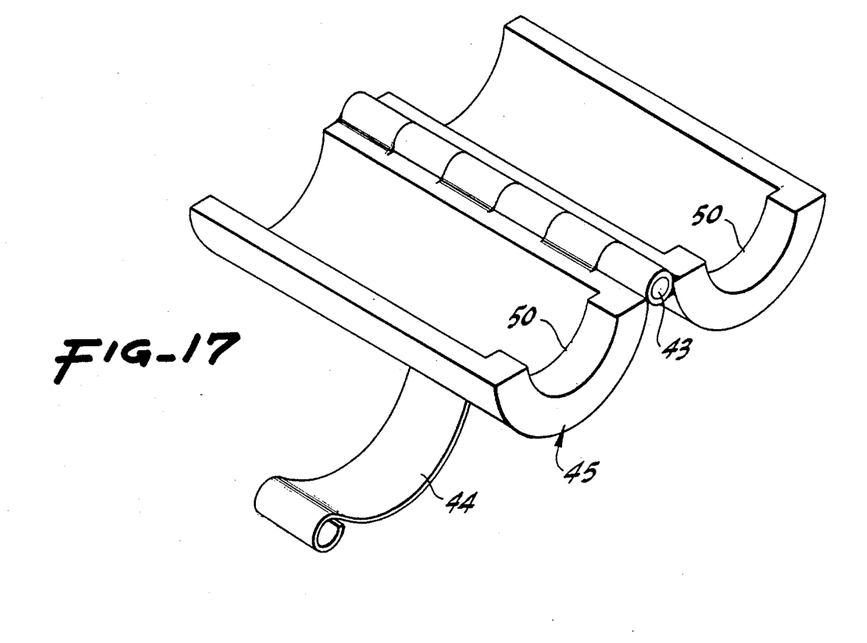
FIG. 17 is an isometric view of a bushing removal positioner.

For use with the bar 12 there are provided one or more bushing positioners 42 (FIG. 16) especially for installing bushings, or sleeves 45 (FIG. 17) especially for removing bushings. Each positioner 42 and each sleeve 45 is preferably made of two semi-circular or cylindrical halves extending axially for a distance somewhat less than the distance between camshaft bushings. The halves are joined together longitudinally by a hinge 43 and may remain open or may be put together and yieldingly retained by a hinged snap or leaf spring 44.

In practice, the operator places an open positioner 42 or sleeve 45 adjacent the bar 12 near one of the grooves 21 in the bar. The bushing positioner 42, on the inside of each half, between the ends, has a semi-circular fin 46 sized to fit snugly in any bar groove 21. A central fin may also have an axially extending lug 47 sized to fit any of the axial grooves 22 in the bar 12. The fin 46 is not disposed evenly between the ends of the positioner, but is axially displaced to leave a "long" end and a "short" end of the positioner. By turning the positioner 42 end for end the positioner can be properly used with bearings of different axial lengths. Proper positioning is effected by matching the long leg 47A and short leg 47B of the lug 47 with the long leg 22A and short leg 22B of the axial grooves 22 (see FIG. 8). When the positioner 42 is placed to suit, the operator snaps the halves shut and the positioner is retained by the leaf spring 44.

The bushing removing sleeve 45 is similarly placed but uses semi-circular end flanges 50, sized to fit snugly in the bar groove 21, rather than central flanges 46 as in the bushing installing positioner 42.

In use, a closed positioner 42 or sleeve 45 is located closely adjacent the exposed end 30 of the piston tube 32 of the jack 35. The bushing installing positioner 42 is locked, temporarily, against any rotary or axial motion relative to the bar 12. The bushing removing sleeve 45 need only be locked, temporarily, against any axial motion relative to the bar since angular alignment is immaterial when an old bushing is removed.

Thus, when the jack 35 (being anchored either in the yoke 23, as in FIG. 1, or against rearward movement only, as in FIG. 12) is actuated, the exposed end 30 of the piston tube 32 bears against a locked positioner 42 (or a locked sleeve 45). The bar 12 is thereby translated axially, either to remove bushings or to install bushings, as will now be explained.

To remove already installed bushings, a set-up as illustrated in FIGS. 9-12 is used.

The bar 12 is introduced endwise into the camshaft alley 7. The jack 35 is oriented on the bar as shown; and after the bushing removal sleeve 45 is snapped and locked on the bar with the circular end flange 50 in a convenient groove 21, the exposed end 30 of the piston tube 32 is abutted against the adjacent end of the sleeve 45, with the jack 35 located as appears in FIGS. 9-12.

Figure 9:
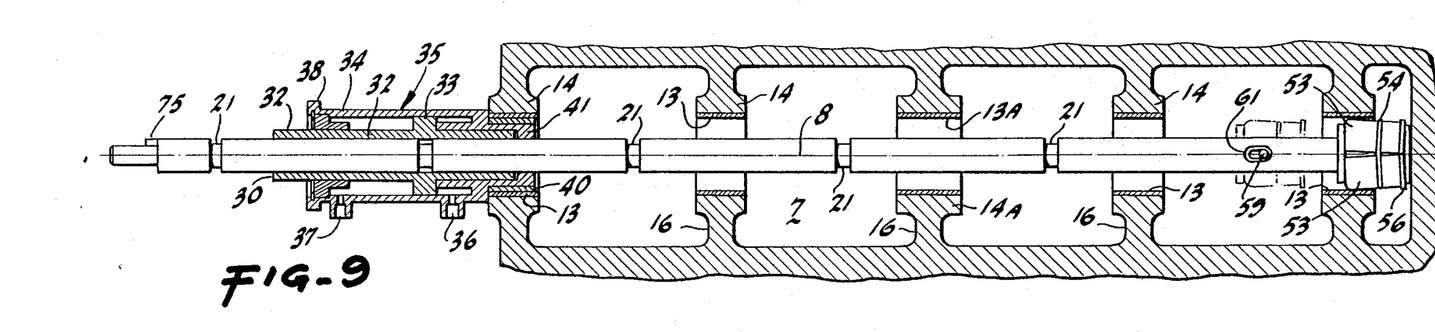
FIG. 9 is a view like FIG. 1 but showing the parts in position to remove a bushing.
Figure 10:
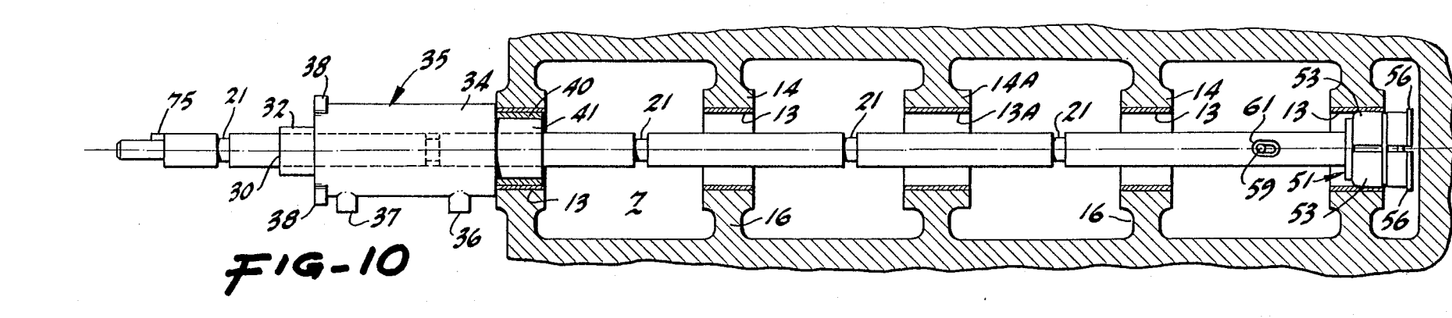
FIG. 10 is a view like FIG. 9 but showing a bushing-engaging member in a different position.

Threaded onto the other end of the bar is a special nut 51, or head, (FIG. 12) having a re-entrant flange 52 under which are hooked four rockers 53. These rockers 53 are arranged separately and are somewhat spaced apart around the head 51 (FIG. 13). A circumferential band 54 resiliently urges the rockers 53 together, as shown in FIG. 9. The rockers 53 each have an outstanding end flange 56 adapted to overlie but not extend radially beyond the bushing 13. For manipulating the rockers there is a cone 57 adapted to engage the rockers and to move axially with respect to the bar under control of a threadedly engaged pin 58 coaxially and slidably disposed in the counterbored end of the bar 12. An operating rod 59 intersects the pin 58 and, operating in a slot 61 in the bar 12, axially moves the pin 58 fore and aft, moving the cone 57 accordingly and causing the end flanges 56 on the rockers 53 to engage or release the end bushing 13. In the position of the operating rod 59 shown in FIGS. 10, 11 and 12, the end flanges 56 engage the end bushing 13 so that translation of the bar 12 in a left-hand direction will remove the bushing 13 from the bushing carrier 14.

Figure 11:
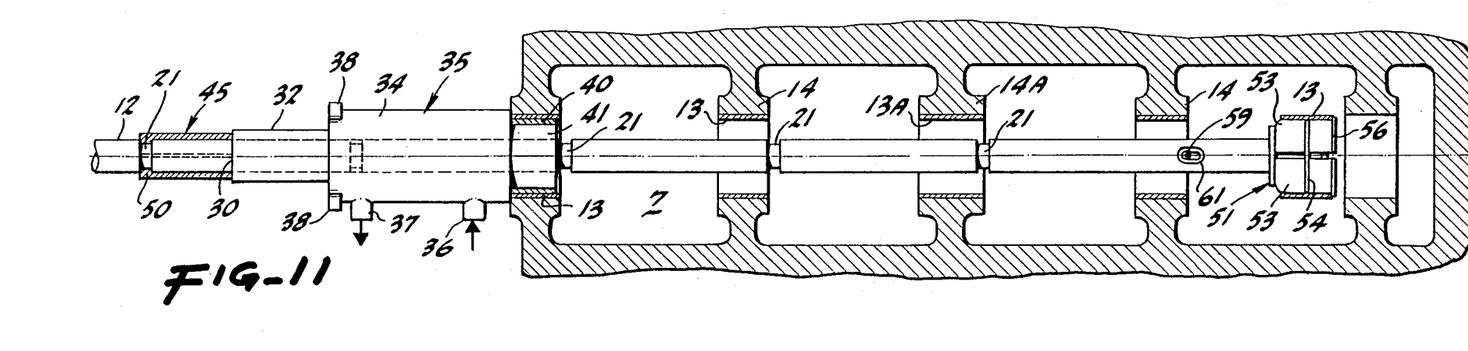
FIG. 11 is a view like FIG. 10 but with a bushing partly removed.

The end of the bar 12 on which the sleeve 45 is positioned carries the jack 35, the jack being located so that the reduced end 41 of the jack and any necessary adapter 40 nests snugly in the front bushing 13 with part of the cylinder 34 abutted against the engine face 9, or, more precisely, against the forward face of the forward bushing carrier 14. The bushing removing sleeve 45 is located as shown in FIG. 12, with the circular end flange 50 of the sleeve 45 in a groove 21 and with the two halves snapped onto the bar 12 against the adjacent end 30 of the piston tube 32. When pressure is admitted to the right end (FIG. 12) of the cylinder 34 through the port 36, the exposed end 30 of the piston tube 32 abuts the sleeve 45 and the bar 12 is forced to the left, causing the expanded rockers 53 to pull the end bushing 13 out of its engine seat, as shown in FIG. 11.

When the jack 35 is actuated as above, in a bushing removing direction, by the double-acting pressure unit shown in FIG. 12, pressure for the port 36 is available from a pressure member 63 mounted on a reservoir tank 64 and containing a plunger (not shown) operable by a treadle 66 to force oil from the reservoir 64 through a line 67 and through a manually controlled valve 68 and through a line 69 to the port 36 when the valve 68 is in a position opposite to (i.e. displaced 90° from) the position shown in FIG. 12. Discharge from the cylinder 34 is through the port 37 and a line 70 and through the valve 68 (in opposite position to that shown) and through a return line 71 to the tank 64.

If pressure air is available, foot pumping of the treadle 66 may be obviated by joining an air pressure hose to a fitting 72 opening into the pressure member 63. When the valve 68 is in the position shown, pressure is put upon the port 37 and the piston 33 is urged toward the right in FIG. 12.

In some situations, where the previously described elementary mechanism is acceptable, the pressure-air or hydraulic piping and controls of FIG. 12 can be reduced by removing the structures engaging the ports 36 and 37. Then, when the piston 33 is to be moved leftward, an air pressure nozzle can be put temporarily to the port 36 and the port 37 can be left open to atmosphere. The result is leftward movement of the piston 33. If power restoration of the piston position is desired, the air nozzle can be put at the port 37 and the port 36 can be left open to atmosphere.

With all of the foregoing, the inner, end bushing 13 can be shifted from its site in the carrier 14 and on the rockers 53 and into the crankcase, as appears most clearly in FIG. 11. The bar 12 can there be stopped and the bushing manually removed from the rockers 53 when they are retracted by returning the operating rod 59 and pin 58 to the position shown in FIG. 9. The bushing can be finally moved manually and laterally out of the crankcase or camshaft alley through the openings in the sides thereof.

Similar operations of the bar 12 and of the rocker mechanism 53 on each succeeding bushing will effectuate serial removal of all of the bushings except the front or number one bushing. Removal of the front or number one bushing can be accomplished by using some of the equipment furnished and operated to install or reinstall new bushings, as will now be described in detail.

In fact, the bushing installing equipment now to be described can be used to remove all of the bushings except the end bushing, or "blind" bushing. To remove the end bushing, as in FIGS. 9-11, the equipment heretofore described is used.

Figures 1, 2, 3, 4:
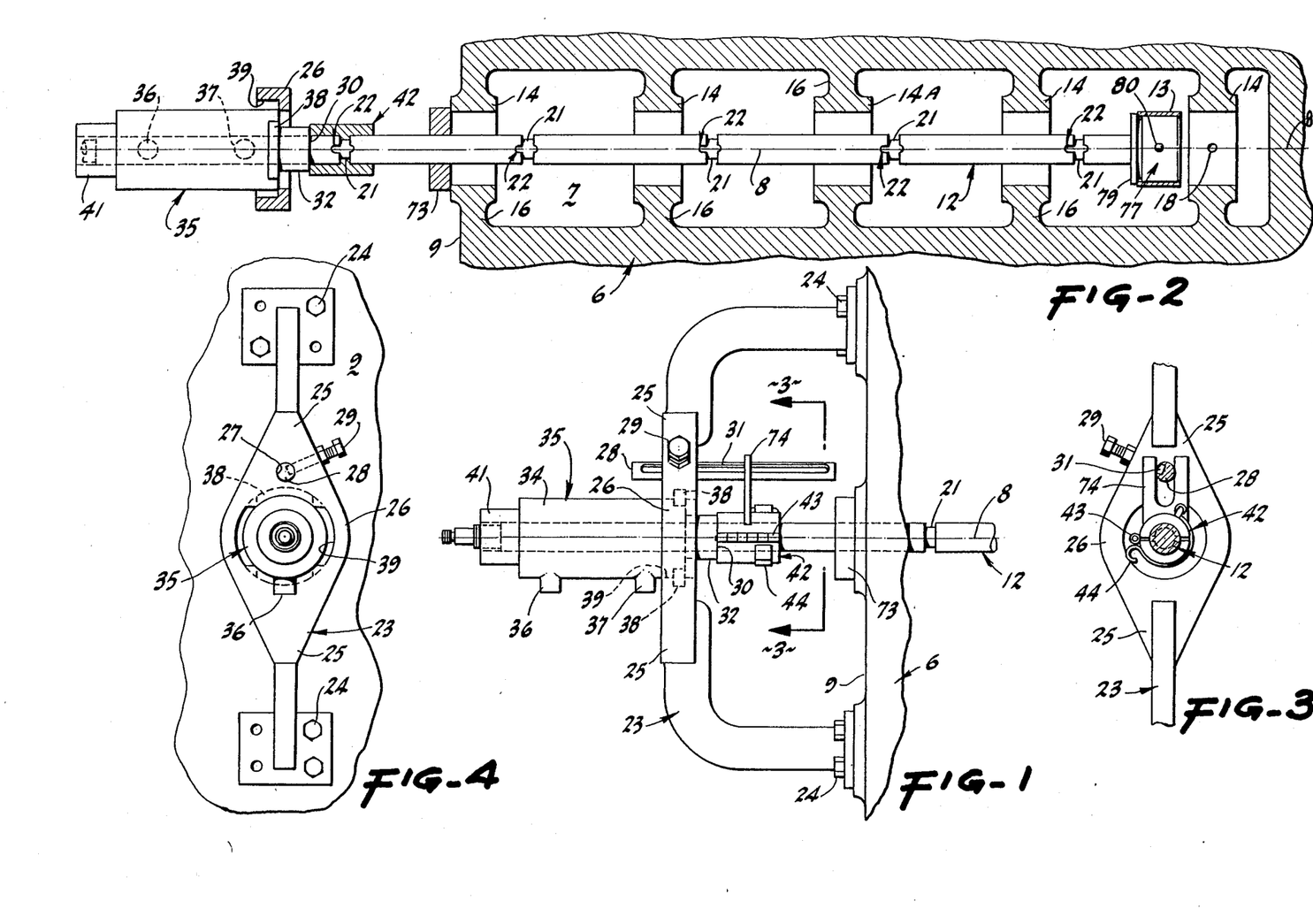
FIG. 1 is a side elevation of the jack and yoke mechanism in position to install a bushing, various parts being broken away.
FIG. 2 is a cross-section on an axial plane through part of the cam alley of an engine, the bushing installing mechanism being in place.
FIG. 3 is a cross-section, the plane of which is indicated by the line 3—3 of FIG. 1.
FIG. 4 is an elevation of the structure of FIG. 1.

To accomplish installation in the crankcase or camshaft alley 7 of new, individual bushings, either long or short, equipment as shown in FIG. 1 is employed.

The yoke 23 is secured on the engine face 9 and the bayonet connector 38 is rotated into position to secure the cylinder 34 in a position end for end, opposite the position shown in FIG. 9. The bushing positioner 42 is keyed in the correct polar position on the bar 12, and the fork arm 74 (FIGS. 3 and 6) on the positioner 42 is engaged with the rod 28 so that the bar 12 is rotatably oriented to assure and maintain correct polar positioning and alignment of the bushing oil holes 17 and oil passages 18 in the engine block as the bar carrying a bushing (see FIG. 2) is translated into position by the jack 35.

Pressure is furnished to the port 36 of the reversed cylinder 35 (FIG. 1), and the bushing positioner 42 in engagement with the end 30 of the piston tube 32 moves the bar 12. This forces a new bushing 13 into an empty bushing holder 14 in the crankcase with the bushing oil hole in suitable registry with the respective crankcase oil passage 18. The axial installing motion is stopped at the correct axial location. The positioner 42 abuts a stop washer 73 slidably disposed on the bar 12 and the washer then abuts the forward face of the engine, or, more accurately, the forward face of the front bushing carrier 14.

Each of a series of bushings can be positioned on the bar 12 inside the crankcase and can similarly be forced (to the right in FIG. 2) into its respective bushing carrier 14. In this way the engine is, by repeated operations, completely rebushed.

As appears most clearly in FIGS. 2, 5, 6 and 7, the new bushing 13, while being installed, fits on a circular cylindrical cap 77, or head, having a keyway 76 to receive a key 75 protruding radially from the bar 12. The key 75 is axially aligned with the short axial grooves 22 intersecting each of the circumferential grooves 21.

A set screw 78 temporarily secures the cap 77 to the bar 12, and an annular flange 79 on one end of the cap abuts the adjacent end of the bushing to urge the bushing into installed position as the jack forces the bar to the right. The outer diameter of the flange 79 is slightly less than the outer diameter of the bushing.

In order to effect accurate register of the radial oil holes 17 in the bushing with the respective oil passages 18 in the bushing carriers 14, the cap 77 includes two spring-urged ball detents 80 and 81. The ball detent 80 is axially positioned so that it registers with the radial oil hole 17 in a short bushing 13 (see FIG. 6), and the ball detent 81 is axially located to register with the radial oil hole 17A in a long bushing 13A (see FIG. 7).

When a short bushing 13 is to be installed, the bushing is slid onto the cap 77 until the front end of the bearing abuts the flange 79. Concurrently, the bushing 13 is manipulated angularly so that the radial oil hole 17 (see FIG. 6) registers with the ball detent 80, allowing the ball to protrude slightly into the oil hole 17 and thus temporarily holding the bushing in proper position on the cap as installation proceeds. Registry between the ball 80 and oil hole 17 can be sensed as the ball 80 "snaps" into the hole 17.

Owing to the predetermined positioning of the key 75 and the keyway 76 in the cap 77, as well as the short axial grooves 22 in the bar 12, the axially extending lugs 47 (on the bushing positioner 42), which fit into the grooves 22, and the placement of the fork arm 74 (on the bushing positioner 42), which straddles the fore and aft rod 28, the bushing 13 is maintained in alignment as the jack urges the bar to the right. Thus, when the positioner 42 abuts the washer 73, the bushing 13 is seated in the bushing carrier 14. Then, when the bar is retracted, the radial oil holes 17 in the bushing are in accurate register with the respective oil passages 18 in the bushing carrier 14.

Figures 5, 6, 7, 8:
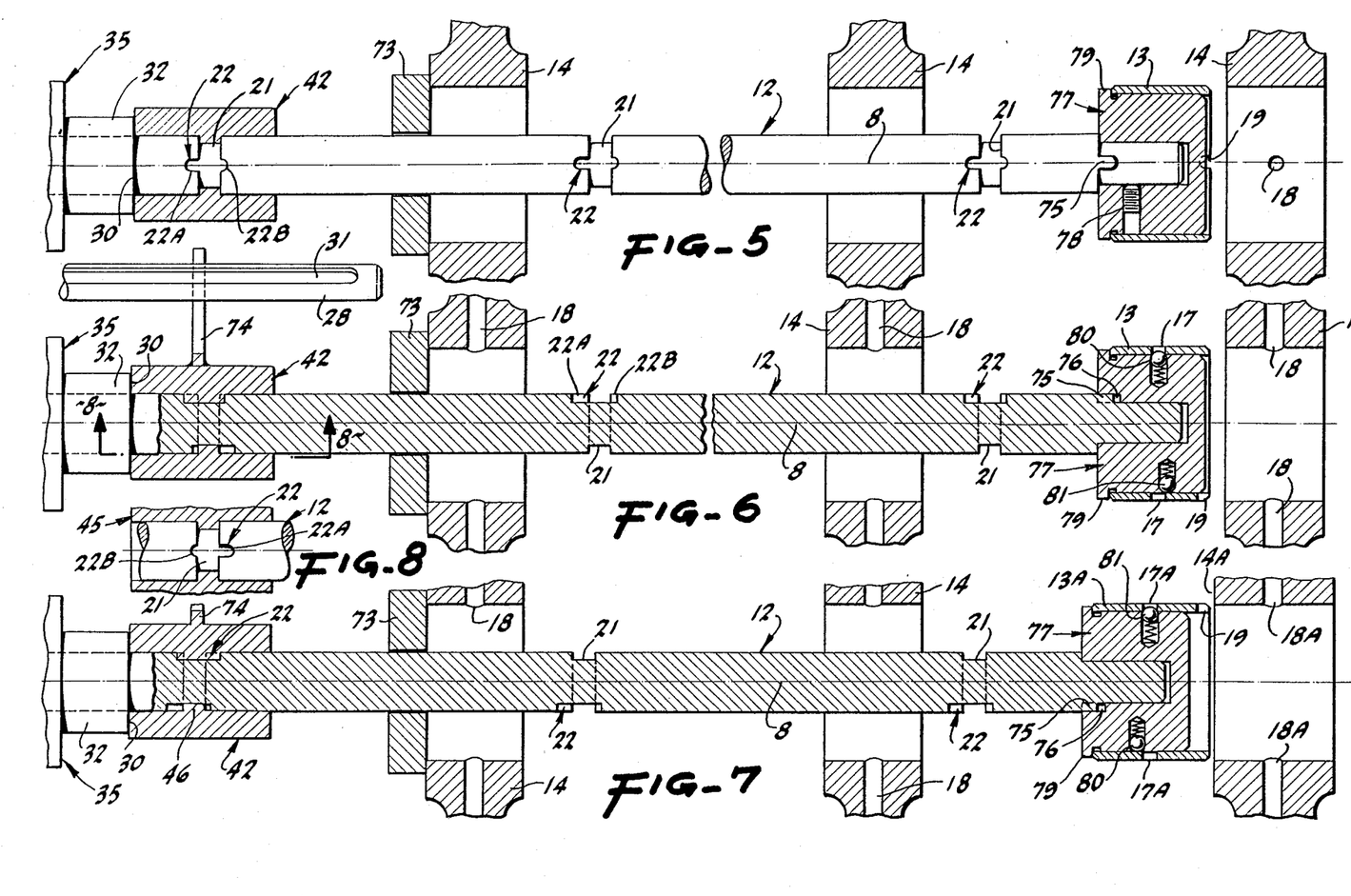
FIG. 5 is an axial cross-section through some engine bushing carriers and showing installation of a short bushing, parts being broken away.
FIG. 6 is a view like but at right angles to FIG. 5 and showing the installation of a short bushing, parts being broken away.
FIG. 7 is a view like FIG. 5 but showing the installation of a long bushing, parts being broken away.
FIG. 8 is a cross-section on the line 8—8 of FIG. 6.

FIG. 7 depicts a long bushing 13A preparatory to being installed in a long bushing carrier 14A. Here, the ball detent 81 registers with the radial oil hole 17A in the long bushing 13A. Thus, when the bushing is fully inserted in the long bushing carrier 14A and the cap 77 is withdrawn to the left, the radial oil holes 17A are in accurate register with the oil passages 18A.

It should again be noted that with the set-up shown in FIG. 2, not only can installation of new bushings in all the bushing carriers be effected in the manner just described. The same set-up can also be used to remove all of the old bushings except the right-hand end bushing, or "blind" bushing, which requires that the special head 51 be used.

When the old bushings are removed from their carriers, there is no need to be concerned with alignment or with registering oil holes with oil passages, as there is when new bushings are installed. Therefore, all of the old bushings can be "pushed" out of the respective bushing carriers, with the exception of the end bearing, which must be "pulled" out of the carrier. Either the set-up of FIG. 9 or the combination of FIG. 2 and FIG. 9 can be used.

Where new bushings are to be installed, however, accurate register of oil hole and oil passage dictates that the set-up of FIG. 2 be used.

What is claimed is:

1. A camshaft bushing positioner for use with an engine block having a face and having a camshaft alley with bushing holders aligned along a main axis and of predetermined inside dimensions across said axis, comprising a bar adapted to extend concentrically with said axis in said bushing holders, a yoke adapted to abut said face, means on said yoke for receiving said bar for relative sliding ;motion along said axis, means interconnecting said bar and said yoke for sliding said bar relative to said yoke and along said axis, a sleeve adapted to encompass said bar and having an outside dimension across said axis no greater than said predetermined inside dimensions of said bushing holders, said sleeve being split in an axial dimension and being movable transversely of said axis between a position alongside said bar and a position encompassing said bar, and means for preventing relative axial motion between said sleeve and said bar.

2. A device as in claim 1 including means for sliding said bar and said sleeve along said axis in both of two opposite directions.

3. A device as in claim 1 in which said bushing holders have radial oil holes therein and said bushings also have radial oil holes therein, and means on said bar and on said sleeve and on said bushing for positioning said bushings with said oil holes therein in registry with said oil holes in said bushing holders.

4. A camshaft bushing positioner for use with an engine block having a face and having a camshaft alley with bushing holders aligned along a main axis and of predetermined inside dimensions across said axis, comprising a bar adapted to extend concentrically with said axis in said bushing holders, a yoke adapted to abut said face, means on said yoke for receiving said bar for relative sliding motion along said axis, means interconnecting said bar and said yoke for sliding said bar relative to said yoke and along said axis, a sleeve adapted to encompass said bar and having an outside dimension across said axis no greater than said predetermined inside dimensions of said bushing holders, said sleeve including two semi-circular portions adapted to be disposed with axially extending edge faces thereof substantially abutting each other, means for hinging said portions to each other for movement about a hinge axis parallel to said main axis and near one of said edge faces, means for releasably holding said portions against said movement about said hinge axis, and means for preventing relative axial motion between said sleeve and said bar.

5. A camshaft bushing positioner for use with an engine block having a face and having a camshaft alley with bushing holders aligned along a main axis and of predetermined inside dimensions across said axis, comprising a bar adapted to extend concentrically with said axis in said bushing holders, said bar being provided with circumferential grooves in number and in axial spacing on said bar corresponding to the number and axial spacing of said bushing holders in aid engine, a yoke adapted to abut said face, means on said yoke for receiving said bar for relative sliding motion along said axis, means interconnecting said bar and said yoke for sliding said bar relative to said yoke and along said axis, a sleeve adapted to encompass said bar and having an outside dimension across said axis no greater than said predetermined inside dimensions of said bar being provided with circumferential grooves corresponding in number and in axial spacing to the number and axial spacing of said bushing holders in said engine, and means for preventing relative axial motion between said sleeve and said bar.

6. A camshaft bushing positioner for use with an engine block having a face and having a camshaft alley with bushing holders aligned along a main axis and of predetermined inside dimensions across said axis, comprising a bar adapted to extend concentrically with said axis in said bushing holders, a yoke adapted to abut said face, means on said yoke for receiving said bar for relative sliding motion along said axis, means interconnecting said bar and said yoke for sliding said bar relative to said yoke and along said axis, said bar carrying adjacent one end a radial rod engageable with said yoke to establish the polar orientation of said bar and said yoke, a sleeve adapted to encompass said bar and having an outside dimension across said axis no greater than said predetermined inside dimensions of said bushing holders, said sleeve being split in an axial dimension and being movable transversely of said axis between a position alongside said bar and a position encompassing said bar, and means for preventing relative axial motion between said sleeve and said bar.

7. A device as in claim 4 in which at least one of said sleeve portions has a projection extending radially inwardly from the interior surface of said one portion.

8. A device as in claim 4 in which at least one of said sleeve portions has a semi-annular projection extending radially inwardly from a portion of the inward surface thereof between the ends of said sleeve portion.

* * * * *